No. 665,158. Patented Jan. 1, 1901.
W. R. ABRAMS.
BORING MACHINE.
(Application filed Feb. 8, 1900.)
(No Model.) 2 Sheets—Sheet 1.
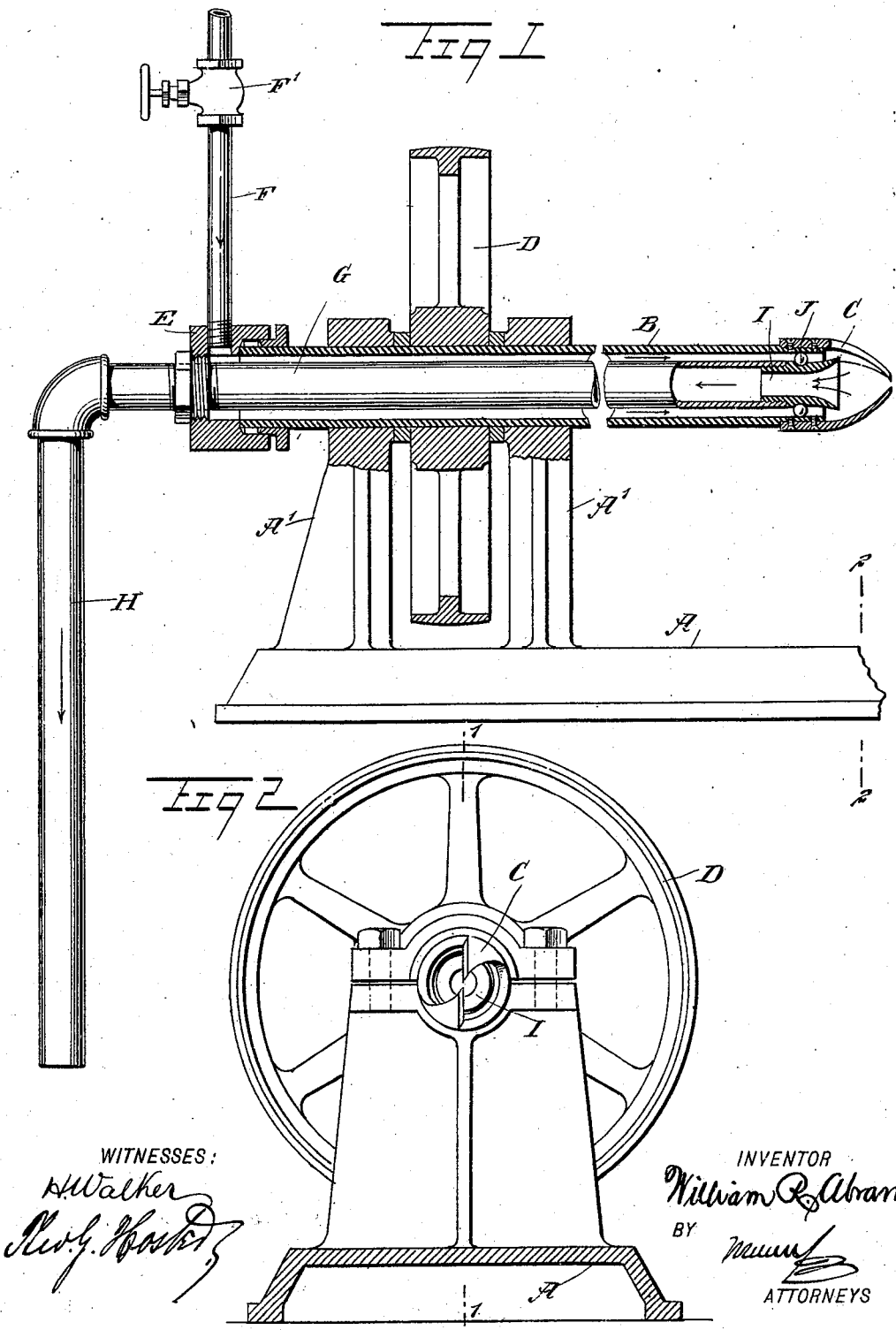

No. 665,158. Patented Jan. 1, 1901.
W. R. ABRAMS.
BORING MACHINE.
(Application filed Feb. 8, 1900.)
(No Model.) 2 Sheets—Sheet 2.
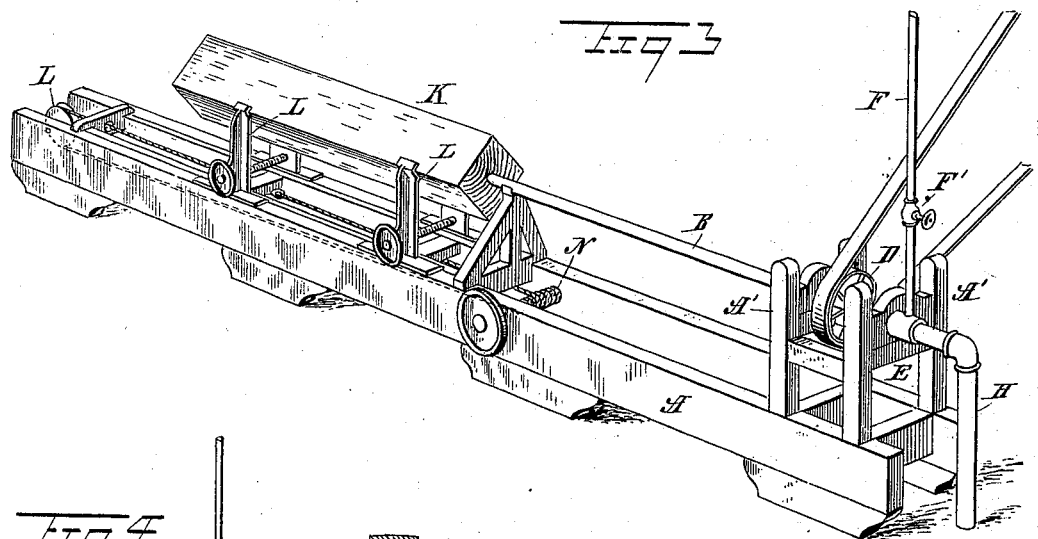
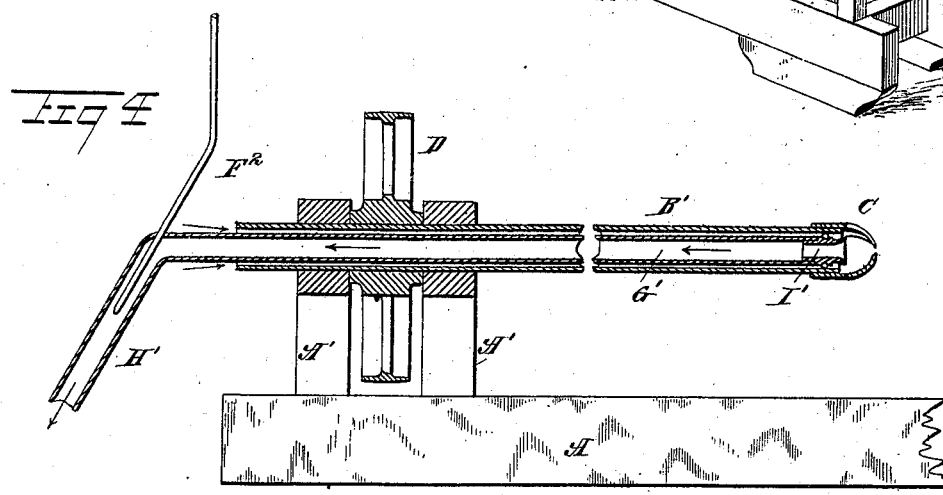
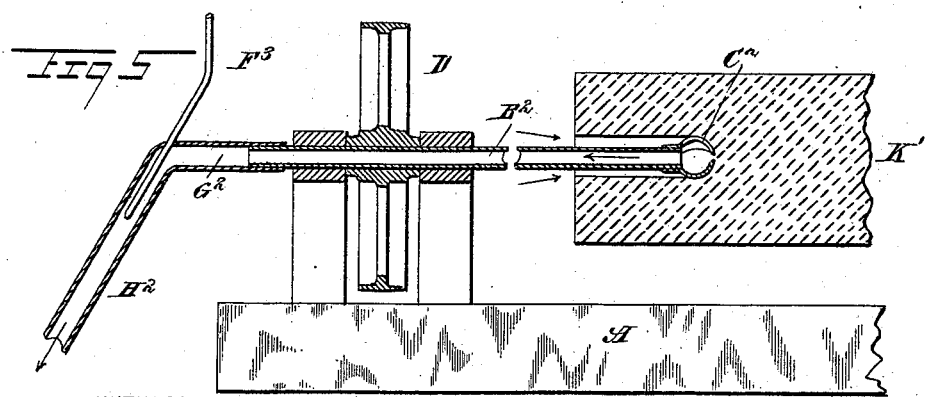

UNITED STATES PATENT OFFICE.

WILLIAM ROLLINS ABRAMS, OF PORTLAND, OREGON, ASSIGNOR TO THE HAND MANUFACTURING COMPANY OF OREGON, OF SAME PLACE.

BORING-MACHINE.

SPECIFICATION forming part of Letters Patent No. 665,158, dated January 1, 1901.

Application filed February 8, 1900. Serial No. 4,483. (No model.)

*To all whom it may concern:*

Be it known that I, WILLIAM ROLLINS ABRAMS, a citizen of the United States, and a resident of Portland, in the county of Multnomah and State of Oregon, have invented a new and Improved Boring-Machine, of which the following is a full, clear, and exact description.

The object of the invention is to provide a new and improved boring-machine designed for boring into wood or other materials and arranged to readily remove the cuttings from the cutter or bit in the bore to insure a rapid boring without danger of clogging or breaking the tool.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a sectional side elevation of the improvement on the line 1 1 in Fig. 2. Fig. 2 is an end elevation of the same, with part in section, on the line 2 2 in Fig. 1. Fig. 3 is a reduced perspective view of the improvement as applied. Fig. 4 is a longitudinal sectional elevation of a modified form of the improvement, and Fig. 5 is a similar view of another modified form of the improvement.

The improved boring-machine (illustrated in Figs. 1, 2, and 3) is mounted on a base or bed A, having standards A', in which is mounted to rotate the hollow shank B of a boring-tool, said shank carrying at its forward end a cutter or bit C and between the standards A' a wheel D, connected by belt with other machinery for imparting a rotary motion to the said shank B and its cutter or bit C. The rear end of the shank B is mounted to turn in a head E, connected by a pipe F, having a valve F', with a suitable source of fluid-pressure supply—such as steam, compressed air, or the like—to pass the fluid through the said pipe F under pressure into the shank B of the boring-tool. Within the latter is arranged a discharge-pipe G, secured at the rear end in the stationary head E and connected with a pipe H for carrying off the cuttings to a desired place of discharge.

The forward end of the pipe G is provided with a nozzle I, the flaring mouth of which extends into the cutter or bit C, and on said nozzle is externally mounted a ball-bearing J, engaging the inner face of the forward end of the shank B, as is plainly indicated in Fig. 1. The cutting arms or prongs of the bit C are curved inward and forward, as is plainly indicated in Figs. 1 and 2, so that the flaring mouth of the nozzle I is within the said arms, and consequently the chips and cuttings readily pass from the cutting edges of the bit to the inside thereof and to the entrance or flaring mouth of the said nozzle I, owing to the fluid under pressure passing first forwardly through the shank B to the cutter or bit to carry the chips and cuttings along into the nozzle I, the fluid then traveling rearwardly with the chips through the pipes G and H to a suitable place of discharge. It is understood that the fluid under pressure has no other escape except through the pipe G, as the cylindrical body portion of the bit closes the hole or bore already made in the wood or other material, and as the cutting edges of the bit are so arranged as to direct the cuttings or chips to the inside of the bit it is evident that the said chips readily pass into the nozzle I at the flaring mouth thereof. By having the pipe G stationary a ready support is had for the nozzle I and the ball-bearing J, so that the outer or cutting end of the boring-tool is properly supported to insure a straight boring in the wood or other material.

By the arrangement described the chips or cuttings are removed from the bore as quickly as formed, and consequently there is no danger of the boring-tool becoming clogged or bent or broken, especially when drilling very deep holes.

The material bored by the bit C, as shown in Fig. 3, is a block of wood K, held on a carriage L, mounted to travel on the bed or base A and be fed toward the bit C by a suitable feeding device N.

As shown in Fig. 4, the shank B' is open at the rear end for the entrance of air, and the pipe G' has an angular discharge end H', into which discharges the pipe F², connected with a motive-agent supply, so that the motive agent in passing through the end H' causes a suction in the pipe G' to draw the chips or cuttings from the bit C' into the nozzle I' and rearward in the pipe G' to finally discharge the cuttings or chips through the end H'.

As illustrated in Fig. 5, the discharge-pipe G within the shank is entirely dispensed with and the hollow shank B² is used as the discharge for the chips or cuttings. In this case the rear end of the shank is connected with and revolves in a stationary suction-pipe G², having an angular end H², into which extends the motive-agent-supply pipe F³, so that the motive agent causes a suction in the pipe G² and the shank B² to draw the chips from the bit through the shank B² and pipe G² to a place of discharge. The bit C² is made considerably larger in diameter than the shank B², so that the bore forms a large air-entrance in the block K' to allow air to freely pass to the bit and the end of the shank B².

Having thus fully described my invention, I claim as new and desire to secure by Letters Patent—

1. A boring-machine, comprising a revoluble boring-tool having a hollow shank, a bit at the forward end of the shank, a stationary discharge-pipe leading from the boring-tool and a fluid-pressure pipe for creating a suction to draw the chips or cuttings longitudinally through the said tool and convey them away through the discharge-pipe, substantially as described.

2. A boring-machine, comprising a boring-tool having a hollow shank with a bit at the forward end, a stationary discharge-pipe attached by a sleeve fitting over the rear end of the hollow shank, the said discharge-pipe leading from the hollow shank to carry off the cuttings, and means for creating a suction to draw the cuttings longitudinally through the said tool and convey them away through the discharge-pipe leading therefrom, substantially as described.

3. A boring-machine, comprising a boring-tool having a hollow shank, a stationary discharge-pipe leading therefrom and a motive-agent-supply pipe extending into the discharge-pipe, to create a suction by producing a vacuum in said discharge-pipe, substantially as described.

4. A boring-machine, comprising a boring-tool having a hollow shank with a bit at the forward end, a head at the rear end of the shank, a connection with a fluid under pressure at the said head, a stationary discharge-pipe carried by the head and extending in said shank to the cutter of said tool, and a ball-bearing between the forward end of the pipe and said shank, substantially as shown and described.

5. A boring-machine, comprising a boring-tool having a hollow shank mounted to rotate, a bit secured to one end of said shank, the body of the bit being cylindrical and the cutting-arms bent forward and inward, a stationary head at the other end of said shank and connected with a fluid-pressure supply, a stationary discharge-pipe extending within said shank and having its forward end formed with a nozzle reaching into the opening formed by the arms of said bit, and a ball-bearing mounted on said nozzle and engaging the inner face of the forward end of the shank, substantially as set forth.

In testimony whereof I have signed my name to this specification in the presence of two subscribing witnesses.

WILLIAM ROLLINS ABRAMS.

Witnesses:
E. B. McFARLAND,
HOWARD DAVIS.